July 28, 1936.     C. P. SORENSEN     2,048,715
VEHICLE SIGNALING SYSTEM
Filed Jan. 10, 1934     2 Sheets-Sheet 1
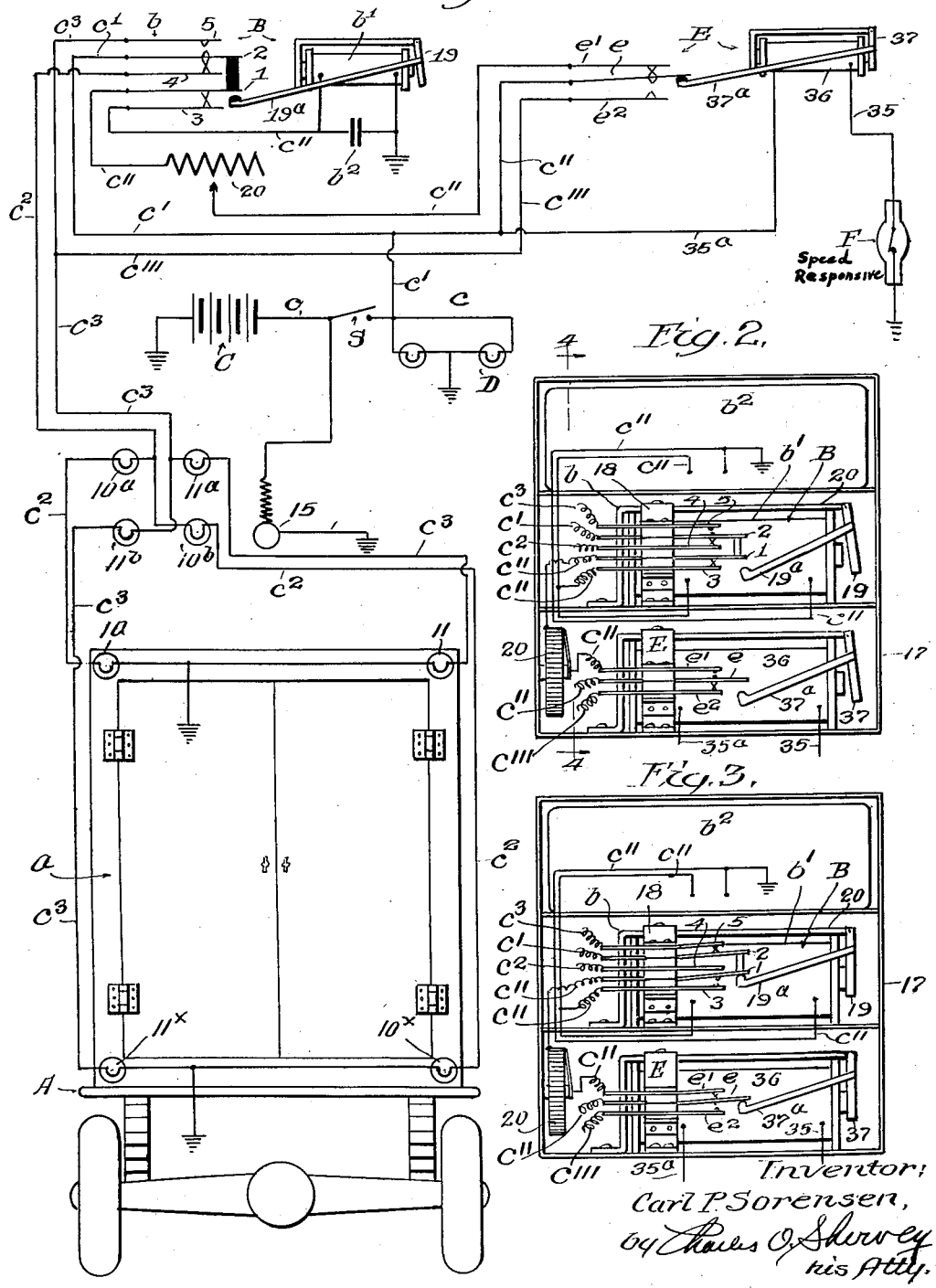

July 28, 1936.   C. P. SORENSEN   2,048,715
VEHICLE SIGNALING SYSTEM
Filed Jan. 10, 1934   2 Sheets-Sheet 2

Inventor:
Carl P. Sorensen,
by Charles O. Shirvey
his Atty.

Patented July 28, 1936

2,048,715

UNITED STATES PATENT OFFICE 2,048,715

VEHICLE SIGNALING SYSTEM

Carl P. Sorensen, Chicago, Ill.

Application January 10, 1934, Serial No. 706,007

6 Claims. (Cl. 177—311.5)

This invention relates to vehicle signaling systems, and its principal object is to provide a novel signaling system for use on vehicles such as motor trucks, automobiles and other motor driven vehicles, for indicating its presence in the dark, to the drivers of vehicles approaching from behind. Another object is to provide automatic means for apprising the driver of a vehicle, equipped with the present invention, of the failure of any of the signaling lamps to properly function. Another object is to provide a number of electric lamps at the rear of the vehicle, together with automatic means for causing a "wig wag" effect by the several lamps, whereby a more effective signal is afforded than by signals in which the lamps remain lit continuously.

An effective signal is very necessary on a stationary vehicle or one running very slowly in the dark, because the driver of a vehicle approaching from the rear, frequently is unable to observe a stationary or slowly moving vehicle unprovided with a tail light or other rear signal lights, and collisions are therefore of frequent occurrence, especially along dark rural roads, and one of the objects of this invention is to provide a signaling system in which the signal lights give a "wig wag" effect while the vehicle is stationary or is moving slowly, and having automatic means for maintaining the signaling lamps in lit condition when the vehicle is running at a fairly good speed.

Another object is to provide electric circuits for the several lamps of the system, having means for momentarily interrupting the circuits for the several lamps in an alternate fashion, whereby, for instance, diagonally disposed lamps at the rear of the vehicle are alternately lit and extinguished, thereby imparting a "wig wag" effect, while the vehicle is stationary and while running slowly, or at high speed if so desired.

Another object is to provide means, as for example, one controlled by a shaft of the vehicle, such for instance as the speedometer shaft, for controlling the "wig wag" and continuously lit effect, whereby when said shaft is stationary or running slowly the "wig wag" effect is maintained and when the shaft is speeded up to a normal running speed or faster, the "wig wag" effect is discontinued and all of the signaling lamps remain lit continuously.

With these and other objects and advantages in view this invention consists in the several novel features hereinafter fully set forth and claimed.

The invention is clearly illustrated in the drawings accompanying this specification, in which:

Fig. 1 is a rear elevation of a motor truck, equipped with a simple form of the present invention, and illustrating the signaling system diagrammatically;

Fig. 2 is a front elevation of certain control mechanism for the circuits showing a certain control magnet in the position occupied when the vehicle is traveling at high speed.

Fig. 3 is a view, similar to Fig. 2 but showing the parts in a different position as when the vehicle is running at slow speed or is stationary;

Figure 4:
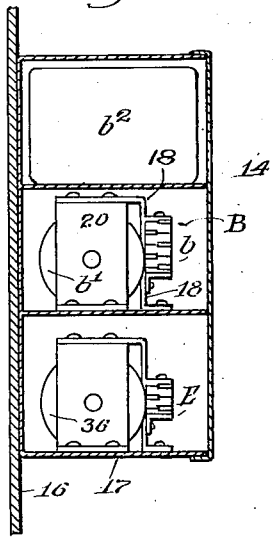
Fig. 4 is a vertical cross-section taken on the line 4—4 of Fig. 2.

Referring to said drawings which are illustrative of one form of the invention and are rather schematic and not intended as working drawings, the reference character A designates a motor vehicle here shown as a truck, of which, $a$, is the rear end wall thereof. Mounted on the rear end of the truck as for instance at the four corners of the end wall, are electric lamps $10, 10^x$, $11, 11^x$, arranged in diagonally disposed pairs and desirably contained in lamp housings, provided with colored lenses, or the electric lamp bulbs themselves may be colored in accordance with standard practice. The electric lamps $10$, $10^x$ are arranged diagonally opposite each other, as are the lamps $11, 11^x$, and during the "wig wag" operation the lamps $10, 10^x$ remain lit while the lamps $11, 11^x$ remain extinguished and vice versa, so that a signaling effect, commonly called a "wig wag" effect, is produced. The periods of illumination of each pair of lamps and the corresponding darkness of the other pair desirably remain for a second more or less, which timing is very effective in directing attention of a driver of a vehicle approaching from behind.

Figure 5:
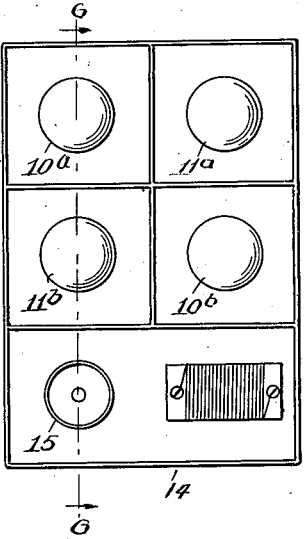
Fig. 5 is a front elevation of a "tell tale" lamp assembly, with its cover removed.
Figure 6:
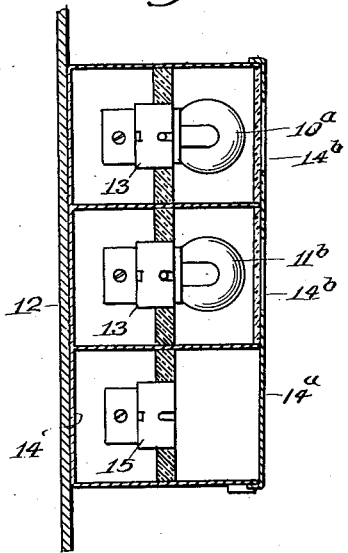
Fig. 6 is a cross-section taken on the line 6—6 of Fig. 5 and showing the cover in place.
Figure 7:
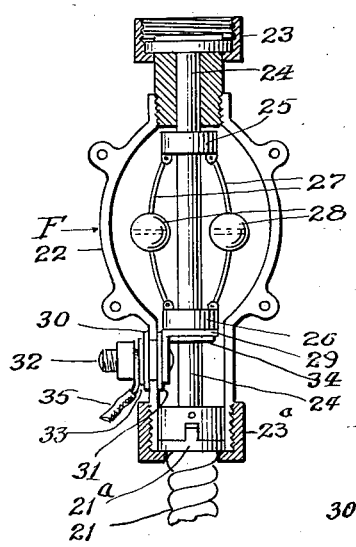
Fig. 7 is a detail sectional view of a circuit controlling governor used in the system.
Figure 8:
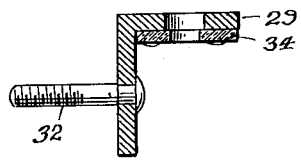
Fig. 8 is a view, partly in elevation and partly in section, of a stationary contact member seen in Fig. 7.
Figure 9:
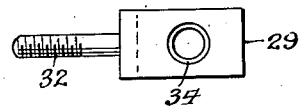
Fig. 9 is an end view thereof.
Figure 10:
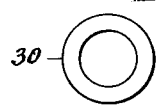
Fig. 10 is a side elevation.
Figure 11:
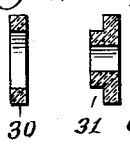
Fig. 11 is a cross-section of an insulating ring seen in Fig. 7.
Figure 13:
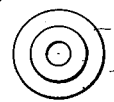
Fig. 13 is a cross-section of a companion insulating bushing.
Figure 12:
Fig. 12 is a side elevation.

Mounted on the dash $12$ (see Fig. 6) or other convenient support in the cab, of the vehicle, in position to be within the vision of the driver, are electric lamps $10^a$, $10^b$, $11^a$, $11^b$, (see Fig. 5) which are arranged in the same relative locations as the signaling lamps $10$, $10^x$, $11$, $11^x$, only spaced close together and held in lamp sockets $13$ (Fig. 6) mounted in a lamp box or housing $14$ fastened to the dash or other desirable support. A cover $14^a$ encloses the lamps in the box and is provided with openings $14^b$ through which the lamps are visible. The lamps $10^a$, $10^b$, $11^a$, $11^b$ are respectively in series with the signaling lamps $10$, $10^x$, $11$, $11^x$, and provide indicating or "tell tale" lamps whereby the driver can, at all times, ascertain if all of the signaling lamps are functioning properly, so that if any particular signaling lamp is not functioning, the driver can instantly ascertain which particular signaling lamp is not functioning and can immediately correct the fault. Conveniently a trouble socket $15$ having a separate circuit is provided in the lamp box $14$, whereby the driver, by removing any "tell tale" lamp which does not light, and by inserting it in the trouble socket, may discover whether the "tell tale" lamp or the corresponding signaling lamp is defective, because if the "tell tale" lamp (when inserted in the trouble socket) lights up, then the corresponding signaling lamp is defective and vice versa.

For effecting the intermittent and alternate lighting effect of the signaling lamps, herein referred to as the "wig wag" effect, circuit making and breaking means B are provided at some convenient position in the vehicle and said means are here shown as mounted on the cowl $16$ of the vehicle (see Fig. 4). Conveniently a switch box $17$ is provided for containing the circuit making and breaking means B. In the form of the invention illustrated, a switch $b$ is employed, through which the electric current is directed to the several lamps and an electromagnet $b^1$ and a condenser $b^2$ connected across the electromagnet, are employed to actuate the switch $b$. As shown, the switch $b$ is composed of two movable contacts $1$, $2$ and three stationary contacts $3$, $4$, $5$, all insulated from each other and mounted on and insulated from a bracket $18$ fastened in the switch box $17$. The electromagnet $b^1$ is mounted in the switch box $17$ and has an arm or armature $19$ pivotally mounted on a bar $20$ mounted in the switch box $17$ which arm $19$ is attracted to the core of the electromagnet $b^1$ when the latter is energized. The arm $19$ is provided with a finger $19^a$ that engages and moves the movable contacts $1$, $2$ whenever the electromagnet $b^1$ is energized, thereby opening contacts $1$, $3$ and $2$, $4$ (see Fig. 3) and closing contacts $2$, $5$, and as a result breaking the circuit for the electromagnet $b^1$, and condenser $b^2$, and shifting the light circuit from the lamps $10^a$, $10^b$, $10$, $10^x$, to the lamps $11^a$, $11^b$, $11$, $11^x$. When the electromagnet $b^1$ is presently de-energized, the arm $19$ drops back and the lamp circuit is shifted back to the lamps $10^a$, $10^b$, $10$, $10^x$.

The condenser $b^2$ is also mounted in the switch box $17$ and is connected across the electromagnet $b^1$, whereby when, in the operation of the system, the condenser will continue to energize the electromagnet for an appreciable predetermined interval of time after the circuit to the magnet and condenser is broken, during which interval of time the circuit through the switch $b$ is directed to one pair of the signaling lamps, and when the electromagnet is de-energized, the circuit through the switch is directed to the other pair of signaling lamps. The lamp circuits and circuits for controlling the switch mechanism will now be described.

The electric current is supplied from the grounded storage battery C (Fig. 1) with which the vehicle is ordinarily equipped. From the line $c$ to the headlights D of the vehicle, a main line $c^1$ leads to contact $2$ of the switch $b$ and thence through contacts $2$, $4$ and line $c^2$ through tell tale lamps $10^a$, $10^b$ and signaling lamps $10$, $10^x$, which are grounded. This is the position of the switch contacts $2$, $4$, $5$ illustrated in Figs. 1 and 2, and while the lamps mentioned are illuminated, the electromagnet $b^1$ is de-energized. When the electromagnet is energized the contacts $1$, $2$ are moved to the position seen in Fig. 3 and the closed circuit may be traced from the main line $c^1$, contact $2$, contact $5$, and line $c^3$ through tell tale lamps $11^a$, $11^b$ and signaling lamps $11$, $11^x$ to ground.

Regarding the two diagonally disposed signaling lamps $10$, $10^x$ as one pair and the lamps $11$, $11^x$ as a pair, it is manifest that when the magnet $b^1$ is alternately energized and de-energized, the current from the battery flows alternately to the two sets of signaling lamps and their corresponding tell tale lamps, whereby a "wig wag" effect is obtained which readily attracts attention of drivers approaching from behind.

In order to alternately energize and de-energize the electromagnet $b^1$ for appreciable periods of duration, so that each pair of lamps will remain alternately illuminated and dark for noticeable periods, the condenser $b^2$ is employed across the electromagnet, and a rheostat $20$ (see Fig. 1) is employed in the circuit for the electromagnet and condenser for regulating the length of time for the periods of illumination. In the arrangement of the condenser across the electromagnet, when the current is turned on, a charge is first built up in the condenser until it is saturated, during which interval the electromagnet remains de-energized because the current flow is not sufficient to energize it, and when the condenser has been saturated the current overflows to the electromagnet, energizes it, causing the arm $19$ to be attracted to the core of the magnet, (see Fig. 3) whereby the finger $19^a$ of the magnet, acts on the contacts $1$, $2$ of the switch $b$, to close the contacts $2$, $5$, thereby shifting the lamp circuit, and simultaneously opening a circuit through contacts $1$, $3$, which feeds the magnet and condenser. However current flows from the saturated condenser to the magnet until the charge has been expended.

The magnet therefore remains energized during this interval, and the current flows through the closed contacts $2$, $5$ for the lamp circuit of one set, until the magnet is de-energized when the arm $19$ springs back and the contacts $2$, $4$, for the circuit for the other lamp set are closed, and also the contacts for the circuit of the magnet and condenser.

The circuit for the magnet $b^1$ and condenser $b^2$ may be traced from a branch $c^{11}$ of the main line $c^1$ through contacts $e$, $e^1$ of a control switch E and through line $c^{11}$ to contacts $1$, $3$ of switch $b$ and from thence through line $c^{11}$ through the magnet $b^1$ and condenser $b^2$ to ground. With a rheostat $20$ in the line $c^{11}$ the flow of current to the magnet $b^1$ and condenser $b^2$ can be regulated to obtain relatively long or short periods of pulsation for the magnet switch.

The "wig wag" operation of the lamps is maintained with the system described so long as the switch contacts $e$, $e^1$ remain closed or so long as there is no break in the line $c^{11}$ at this point.

To obtain the "wig wag" lighting effect while the vehicle is stationary and when driven at a relatively slow speed, as for example, at a speed up to ten miles an hour and in order to continuously or uninterruptedly illuminate all of the signaling and "tell tale" lamps whenever the vehicle is being driven at a higher speed than said low speed, control means, governed by the speed of the vehicle, have been provided for interrupting the action of the circuit making and breaking means B, for the lamp circuits and closing the circuit to that set of lamps whose circuit then remains open at the circuit making and breaking means B.

In the simple form of control means illustrated, a ball governor F is coupled with or interposed in some shaft of the vehicle that rotates continuously while the vehicle is in motion, but which remains stationary while the motor is not running and said governor is arranged to control the switch contacts $e$, $e^1$, in the circuit to the electromagnet $b^1$. The governor is illustrated conventionally as a ball governor (see Figs. 7 to 13), interposed between the usual speedometer (with which motor vehicles are ordinarily equipped) and the speedometer shaft, 21, the housing 22, of the governor is attached to the speedometer and speedometer shaft conduit by coupling nuts 23, 23ª, and the governor mechanism is connected with the flexible shaft of the speedometer shaft assembly by a coupling 21ª. When the motor vehicle is at rest, the speedometer shaft remains stationary and the governor balls and flexible supports therefor remain in their ordinary inoperative position but when the shaft is speeded up as when the vehicle is in motion the centrifugal action on the governor balls tends to swing them outwardly as is well understood. A movable contact member is connected to the flexible governor ball supports and makes contact with a stationary contact when the shaft is at rest and also while rotating at a speed proportioned to the speed of the vehicle up to ten miles an hour, for example, but when the speed exceeds the predetermined one the governor ball supports have been moved back far enough to break the contact between the movable contact member and the stationary one, thereby opening the electric circuit which said contacts control. The movable contact is grounded through the governor and the electrical conductor 35 leads from the stationary contact piece to a control magnet 36.

A conventional ball governor is illustrated having a shaft 24 connected to the speedometer shaft, a collar 25 fast on the shaft 24, a collar 26 sliding thereon, flexible strips 27 connecting the collar and governor balls 28 on the flexible strips. The collar 26 is grounded and serves as the movable contact member which co-operates with a stationary contact member 29, secured to but insulated from the housing by an insulating washer 30 and bushing 31, surrounding a binding post 32 on the contact member 29, extending out through the wall of the housing and having a nut 33 threaded on the binding post and serving to secure the contact member 29 with its insulating washer and bushing in place. The bushing 31 has a reduced neck which passes through the hole in the wall of the housing 22 and the washer 30 bears against the outer side of said wall. The nut 33 clamps the parts together. The shaft 24 passes through a large hole in the stationary contact member 29 and is insulated from said contact member by a block of insulating material 34 fastened to the contact member 29 and having a hole in which the shaft 24 turns.

Leading from the binding post 32 is the wire 35 which runs to one terminal of the control magnet 36, desirably mounted in the box 17. From the main line $c^1$ a wire 35ª runs to the other terminal of the control magnet. The arm 37 of the control magnet has a finger 37ª which actuates the switch contact $e$. It is obvious that so long as the shaft 24 is stationary or running slowly the contacts 26, 29 will be closed and the control magnet 36 will be energized and the contacts $e$, $e^1$ closed whereby the circuit to the magnet $b^1$ and condenser $b^2$ will be closed at the switch contacts $e$, $e^1$ and consequently the alternating or "wig wag" effect of the lamps will be produced. When, however, the speed of the shaft 24 is increased beyond a predetermined one, the ball governor raises the contact member 26 and breaks the circuit for the control magnet 36, thereby de-energizing the same, permitting the arm 37 to spring back and thereby breaking the circuit through conductors $c^{11}$ to the electromagnet $b^1$ and condenser $b^2$ and making these parts inoperative, with the contacts 2, 5, of the circuit for the lamps 11, 11ˣ, 11ª, 11ᵇ, open and the contacts 2, 4 for the circuit for the lamps 10, 10ˣ, 10ª, 10ᵇ closed. The contacts 1, 3 are also left closed but inasmuch as the circuit controlled by them is open at the contacts $e$, $e^1$ the magnet $b^1$ remains de-energized.

With the one lamp circuit closed as just described only one pair of signal lamps 10, 10ˣ and one pair of tell tale lamps 10ª, 10ᵇ remain illuminated, and in order to illuminate the other set of lamps a separate line $c^{111}$ is provided running from the conductor $c^3$ to a switch contact $e^2$ of the control switch E. With the magnet 36 de-energized the contact $e$ contacts with the contact $e^2$ and closes the circuit through the other set of lamps 11, 11ˣ, 11ª, 11ᵇ whereby when the vehicle is traveling at ordinary speed or at least above a speed that operates the governor F, all of the lamps remain lit constantly. As soon as the vehicle slows down to the predetermined low speed at which the governor is not affected, or the vehicle stops, the circuit through the control magnet 36 is again closed, the magnet 36 is energized, and the circuit for the electromagnet $b^1$ and condenser $b^2$ is again established through the contacts $e$, $e^1$, and the circuit controlled by the contacts $e$, $e^2$ is broken, thereby restoring the "wig wag" operation of the lamps.

In the operation of the signaling system when the switch S is closed to turn on the lights, whether the vehicle is stationary or in motion, the signaling system commences to operate and continues until the light switch is again opened.

The electric current from the storage battery or other source of electric energy flows through the main conductor $c^1$ to the set of lamps whose circuits are closed by the switch $b$ (see contacts 2, 4 in Fig. 1 and 2). With the vehicle at rest or moving at slow speed, current from the source of supply also flows through the magnet 36 and closed contacts 26, 29, energizing magnet 36, thereby closing contacts $e$, $e^1$ in the line $c^{11}$, so that current flows from the main line $c^1$ through conductor $c^{11}$, through the contacts $e$, $e^1$ through line $c^{11}$, rheostat 20, contacts 1, 3 and through the condenser $b^2$ and thence to ground. When sufficient energy has been stored up in the condenser, the latter energizes the electromagnet $b^1$ of the lamp circuit alternating switch, whereby the arm 19 of the magnet is drawn over to the core, thereby through the finger 19a moving the movable contacts of switch $b$ (see Fig. 2) and breaking the circuit through the condenser and also through contacts 2, 4, and simultaneously closing contacts 2, 5 and thereby closing the circuit through the other set of lamps. As soon as the charge in the condenser weakens sufficiently to be overcome by the exertion of the resilient contacts of switch $b$, the resilient contacts move the magnet arm back from the core, thereby again closing the contacts 1, 3, whereupon the condenser is again charged, and again the condenser energizes the magnet $b^1$, causing the magnet arm 19 to open contacts 1, 3, open contacts 2, 4, and close contacts 2, 5.

As a result the two sets of lamps are alternately illuminated, giving the "wig wag" effect. When the vehicle has attained predetermined speed the ball governor opens contacts 26, 29, breaking the circuit to the control magnet 36, allowing the magnet arm 37 to drop back and permitting contacts $e$, $e^1$ to open and contacts $e$, $e^2$ to close. The circuit to the condenser $b^2$ and magnet $b^1$ is thereby broken, the magnet $b^1$ is made inoperative and the circuit through contacts 2, 4, for one set of lamps remain closed, but the circuit through the line $c^3$ for the other set of lamps is closed through contacts $e$, $e^2$ of the control switch E. All of the lamps stay lit until the vehicle again slows down to slow speed or stops, when the "wig wag" effect is again started.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. In a vehicle signaling system, the combination of two sets of signaling lamps, circuits therefor, circuit making and breaking means having contacts in said circuits acting to intermittently and alternately close the circuits for the two sets of lamps, when the circuit making and breaking means is operative whereby the circuits are alternately closed and the lamps of the two sets are thereby alternately illuminated, control means for disabling the circuit making and breaking means, whereby one lamp circuit is left closed and one open when the circuit making and breaking means is disabled, and mechanism governed by low and high speed of the vehicle for disabling said control means and therewith closing circuits through the lamps whose circuits are opened by the circuit making and breaking means when the control means is disabled, whereby all of the lamps remain illuminated when the vehicle exceeds a predetermined speed.

2. In a vehicle signaling system, the combination of two sets of signaling lamps, energizing circuits therefor, electro-magnetically operated circuit making and breaking means for intermittently and alternately closing the circuits for the two sets of lamps, whereby the circuits are alternately closed and the lamps of the two sets are thereby alternately illuminated, when the circuit making and breaking means is operative, and one circuit is left closed and one open when the circuit making and breaking means is disabled, a circuit for the coil of said circuit making and breaking means, a circuit in parallel with the set of said lamps whose circuit is left open, a relay having contacts in the circuit for the coil of the circuit making and breaking means and normally open contacts in the parallel circuit, a normally closed circuit for the coil of said relay and a speed responsive switch in the circuit for said relay coil for opening the circuit thereof when the vehicle travels at a speed in excess of a predetermined one, whereby the circuit making and breaking means is disabled and a circuit is closed through the lamps whose circuits are left open when the circuit making and breaking means is disabled.

3. In a vehicle signaling system, the combination of two sets of signaling lamps, main energizing circuits therefor, circuit making and breaking means for intermittently and alternately closing the circuits for each set of lamps, whereby the lamps of the two sets are alternately illuminated, circuit controlling means governed by low and high speed of the vehicle for arresting the operation of the circuit making and breaking means at a predetermined high speed of the vehicle, whereby one of the circuits is left closed and one open, and a normally open branch circuit in parallel with said lamp circuit breaking means which is left open, said branch circuit having contacts closed by said circuit controlling means when the vehicle travels at said predetermined high speed, whereby all of the signaling lamps are illuminated.

4. In a vehicle signaling system, the combination of two sets of signaling lamps, electric circuits therefor, means for alternately breaking said circuits, comprising switch contacts in said circuits, and an electro-magnetic device having means to actuate said switch contacts, when the electro-magnetic device is operative, whereby to simultaneously close one circuit and open the other, said electro-magnetic device, when inoperative, leaving the contacts of one circuit closed and the contacts of the other circuit open, an electric circuit for the coil of said electro-magnetic device having contacts therein opened and closed by said electro-magnetic device, a condenser in parallel with the coil of said electromagnetic device, a circuit in parallel with the contacts which are left open, when the electromagnetic device is inoperative, said parallel circuit, including normally open contacts, a relay and circuit therefor for simultaneously breaking the circuit of said electro-magnetic device and closing said parallel circuit, a shaft, and a governor switch actuated thereby for controlling the circuit for the relay.

5. In a vehicle signaling system, the combination of two sets of signaling lamps, electric circuits therefor, an electro-magnetic device for transferring, when operative, the current from one circuit to the other in alternate fashion, said switch device, when inoperative, having one circuit closed and one open, an electric circuit for said electro-magnetic device, including contacts therein operated by the electro-magnetic device, a parallel lamp circuit for one set of lamps, a relay having contacts in the circuits for the electro-magnetic device and the parallel circuit for simultaneously breaking the electro-magnetic circuit and closing the parallel lamp circuit, a circuit for the coil of the relay, a shaft, and a shaft operated governor actuating switch in the relay circuit for breaking the relay circuit at predetermined high speed, whereby to open the circuit for the electro-magnetic device and close the parallel lamp circuit.

6. In a vehicle signaling system, the combination of two sets of signaling lamps, electric circuits therefor, an electro-magnetic transfer switch means for transferring, when energized, the current from one lamp circuit to the other in alternate fashion, said transfer switch means, when deenergized, leaving one lamp circuit closed and one open, a parallel auxiliary circuit for the set of signaling lamps whose circuit is left open, and a parallel circuit for the coil of said transfer switch means, a second electro-magnetic transfer switch operating, when energized, to open the auxiliary parallel lamp circuit and close the circuit for the first mentioned electro-magnetic transfer switch means, and operating, when deenergized, to close the auxiliary parallel lamp circuit and open the parallel first mentioned transfer switch circuit, thereby disabling said first mentioned transfer switch means, a vehicle shaft, a shaft operated governor, and an energizing circuit for said second switch means, including a switch operated by said governor for opening the circuit to the second named transfer switch means, when the vehicle exceeds a predetermined speed limit.

CARL P. SORENSEN.